(12) United States Patent
Nishimura et al.

(10) Patent No.: US 11,214,492 B2
(45) Date of Patent: Jan. 4, 2022

(54) SILICA PARTICLES

(71) Applicant: NIPPON SHOKUBAI CO., LTD., Osaka (JP)

(72) Inventors: Masaki Nishimura, Hyogo (JP); Yuji Ono, Hyogo (JP); Shoichi Shibazaki, Hyogo (JP)

(73) Assignee: NIPPON SHOKUBAI CO., LTD., Osaka (JP)

( * ) Notice: Subject to any disclaimer, the term of this patent is extended or adjusted under 35 U.S.C. 154(b) by 163 days.

(21) Appl. No.: 16/495,966

(22) PCT Filed: Apr. 5, 2018

(86) PCT No.: PCT/JP2018/014577
§ 371 (c)(1),
(2) Date: Sep. 20, 2019

(87) PCT Pub. No.: WO2018/186468
PCT Pub. Date: Oct. 11, 2018

(65) Prior Publication Data
US 2020/0131044 A1 Apr. 30, 2020

(30) Foreign Application Priority Data

Apr. 6, 2017 (JP) .............................. JP2017-076024
Jun. 29, 2017 (JP) .............................. JP2017-126981

(51) Int. Cl.
*C01B 33/187* (2006.01)
*C08K 3/36* (2006.01)
*C08K 9/04* (2006.01)
*C09C 1/30* (2006.01)

(52) U.S. Cl.
CPC ............. *C01B 33/187* (2013.01); *C08K 3/36* (2013.01); *C08K 9/04* (2013.01); *C09C 1/3063* (2013.01); *C01P 2004/04* (2013.01); *C01P 2004/64* (2013.01); *C01P 2006/12* (2013.01); *C08K 2201/005* (2013.01); *C08K 2201/006* (2013.01); *C08K 2201/011* (2013.01)

(58) Field of Classification Search
CPC ......... C01B 33/18; C01B 33/187; C08K 3/36; C08K 9/04; C08K 2201/005; C08K 2201/006; C09C 1/306; C09C 1/3081; C09C 1/3054; C01P 2004/04; C01P 2004/64; C01P 2006/12; C01P 2006/60; C01P 2006/22; C01P 2006/80; C01P 2004/52; C08L 101/00; C08F 292/00
USPC ....................................................... 524/493
See application file for complete search history.

(56) References Cited

U.S. PATENT DOCUMENTS

| 4,301,027 A | 11/1981 | Blümcke et al. |
| 4,436,823 A | 3/1984 | Blümcke et al. |
| 4,775,520 A | 10/1988 | Unger et al. |
| 4,911,903 A | 3/1990 | Unger et al. |
| 5,221,497 A * | 6/1993 | Watanabe ............. C01B 33/145 106/287.34 |
| 2003/0035888 A1 | 2/2003 | Eriyama et al. |
| 2006/0269733 A1* | 11/2006 | Mizuno .................... B05D 3/06 428/304.4 |
| 2007/0024973 A1 | 10/2007 | Watanabe et al. |
| 2008/0261400 A1* | 10/2008 | Yoshida ............. H01L 21/3212 438/692 |
| 2009/0267021 A1* | 10/2009 | Nakajo ................ C09K 3/1463 252/79.1 |
| 2011/0223534 A1 | 9/2011 | Shibata et al. |
| 2016/0130152 A1 | 5/2016 | Yoshitake et al. |
| 2016/0130425 A1 | 5/2016 | Yoshitake et al. |

FOREIGN PATENT DOCUMENTS

| EP | 3009480 | 4/2016 |
| JP | 55-10490 | 1/1980 |
| JP | 62-72514 | 4/1987 |
| JP | 2001-213617 | 8/2001 |
| JP | 3225553 | 11/2001 |
| JP | 2007-070578 | 3/2007 |
| JP | 2008-019414 | 1/2008 |
| JP | 2008-273780 | 11/2008 |

(Continued)

OTHER PUBLICATIONS

Machine Translation of JP 2010-58985. (Year: 2010).*
Office Action dated Aug. 4, 2020 in corresponding Japanese Patent Application No. 2019-511304 with English-language translation.
Notice of Submission of Information by Third Parties dated Apr. 21, 2020 in corresponding Japanese Application No. 2019-511304, with English Translation.
Extended European Search Report dated Nov. 19, 2020 in corresponding European Patent Application No. 18781118.7.
Office Action dated Jan. 21, 2020 in corresponding Japanese Patent Application No. 2019-511304 with English-language translation.
International Search Report dated Jun. 5, 2018 in International (PCT) Application No. PCT/JP2018/014577.

(Continued)

*Primary Examiner* — Hannah J Pak

(74) *Attorney, Agent, or Firm* — Wenderoth, Lind & Ponack, L.L.P.

(57) ABSTRACT

The object of the present invention is to provide silica particles which can provide a silica particle dispersion exhibiting excellent uniformity. The present invention is silica particles having an average primary particle diameter $d_{BET}$ calculated from a specific surface area by a BET method of 1 nm or more and 100 nm or less and a ratio ($d_{DLS}/d_{BET}$) of an average secondary particle diameter $d_{DLS}$ measured by a dynamic light scattering method to the $d_{BET}$ of 1.2 or less. The silica particles of the present invention preferably have a coefficient of variation in a particle diameter measured using a transmission electron microscope at a magnification of 200,000 of 20% or less.

9 Claims, 2 Drawing Sheets

(56) References Cited

FOREIGN PATENT DOCUMENTS

| | | |
|---|---|---|
| JP | 2010-58985 | 3/2010 |
| JP | 2011-46606 | 3/2011 |
| JP | 2011-206762 | 10/2011 |
| JP | 2012-066235 | 4/2012 |
| JP | 2013-82584 | 5/2013 |
| JP | 2015-140271 | 8/2015 |
| JP | 2016-175981 | 10/2016 |
| WO | 2014/199903 | 12/2014 |

OTHER PUBLICATIONS

Notification of Reason for Refusal dated May 24, 2021 in corresponding Korean Patent Application No. 10-2019-7029421, with Machine Translation.

Notice of Reasons for Refusal dated Jun. 15, 2021 in corresponding Japanese Patent Application No. 2020-191953, with Machine Translation.

* cited by examiner

[Figure 1]
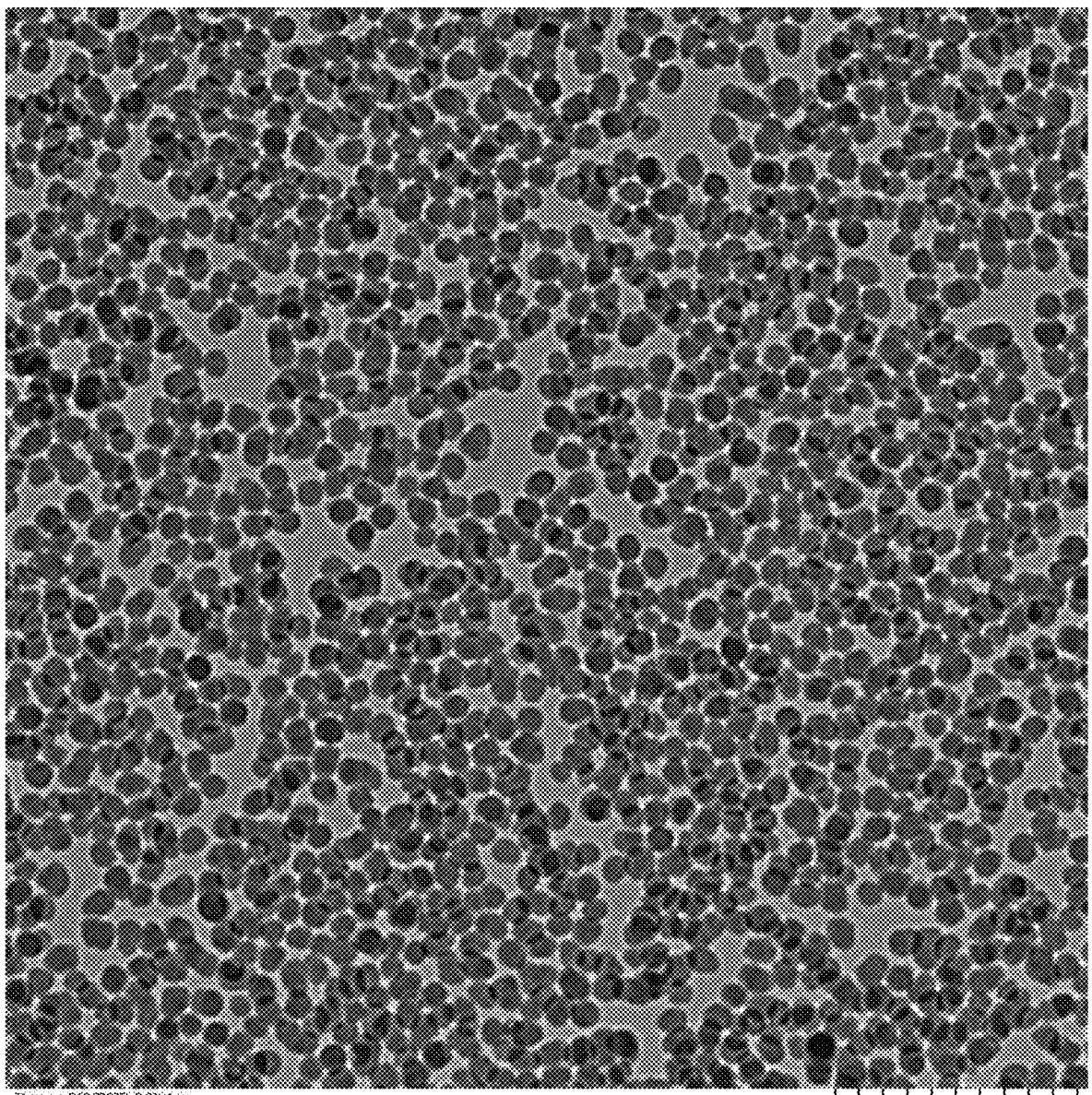

[Figure 2]
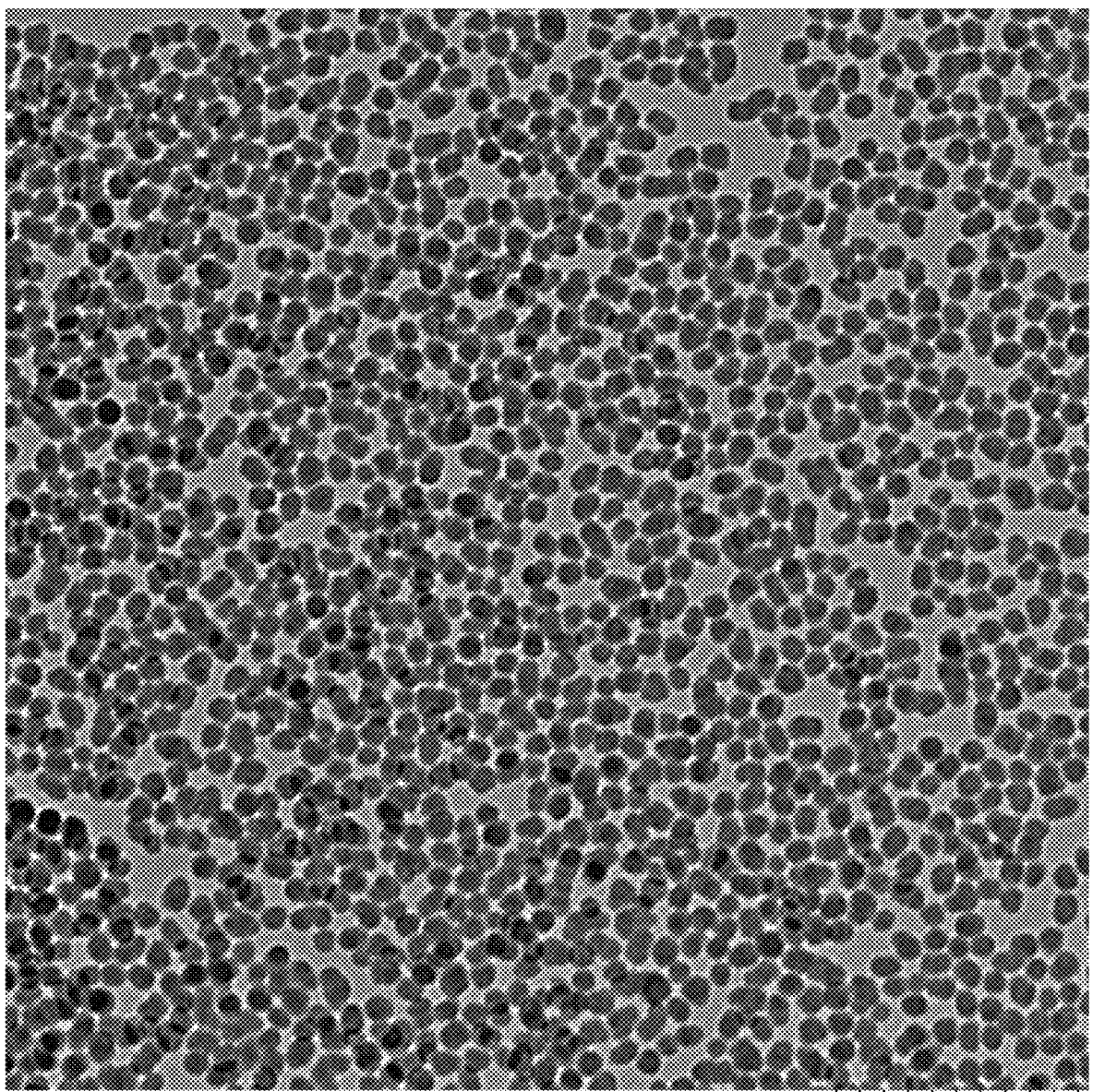

SILICA PARTICLES

TECHNICAL FIELD

The present invention relates to silica particles.

BACKGROUND ART

Silica particles and silica particle dispersions in which silica particles are dispersed in a solvent are useful for applications such as adhesive materials, dental materials, optical members, coating materials (for hard coating and antiglare), and nanocomposite materials since the properties of resin such as strength, hardness, heat resistance, and insulation properties can be improved without impairing the moldability, transparency and the like of resin by being mixed with a resin, a raw material of a resin and the like. In addition, silica particles having a fine particle diameter are also used as an abrasive because of the hardness.

For example, it is described in Patent Document 1 that an aqueous silica sol which has an average particle diameter of 10 to 30 millimicron and does not substantially contain a multimetal oxide other than silica is obtained by bringing an aqueous solution of an alkali metal silicate into contact with a hydrogen-type strongly acidic cation exchange resin.

It is described in Patent Document 2 that silica particles having a primary particle diameter of 24.2 nm and a secondary particle diameter of 30.0 nm is obtained by adding a hydrolyzed liquid obtained by hydrolyzing an alkyl silicate at a temperature of 20° C. or lower to a mother liquor comprising water or alkaline water having a pH of 12 or less.

PRIOR ART DOCUMENTS

Patent Documents

[Patent Document 1] JP3225553B
[Patent Document 2] JP2013-82584A

SUMMARY OF THE INVENTION

Problems to be Solved by the Invention

There have been some cases that the uniformity of silica particle dispersion is not sufficiently satisfactory. The present invention has been achieved in view of the circumstances and object thereof is to provide silica particles which can provide a silica particle dispersion exhibiting excellent uniformity.

Solutions to the Problems

The inventors have found that uniformity of a silica particle dispersion is improved by suppressing a diameter of silica particles to be small and suppressing an aggregation, and the present invention has been made.

The present inventions include the below inventions.

[1] Silica particles having a $d_{BET}$ calculated from a specific surface area by a BET method of 1 nm or more and 100 nm or less and a ratio ($d_{DLS}/d_{BET}$) of a $d_{DLS}$ measured by a dynamic light scattering method to the $d_{BET}$ of 1.2 or less.

[2] The silica particles according to [1], wherein a coefficient of variation in a particle diameter measured using a transmission electron microscope at a magnification of 200,000 is 20% or less.

[3] The silica particles according to [1] or [2], wherein the silica particles are subjected to a surface treatment using a surface treatment agent.

[4] The silica particles according to [3], wherein the surface treatment agent is a surface treatment agent having a (meth)acryloyl group.

[5] A process for producing silica particles, comprising hydrolyzing an alkoxysilane in presence of water, a basic catalyst, and an aromatic heterocyclic compound having a nitrogen atom.

[6] A silica particle dispersion comprising the silica particles according to any one of [1] to [4], and a solvent.

[7] The silica particle dispersion according to [6], comprising a dispersant.

[8] The silica particle dispersion according to [7], wherein a molecular structure of the dispersant has an amine structure.

[9] A silica particle-containing resin composition comprising the silica particles according to any one of [1] to [4], and a polymerizable monomer and/or a polymer material.

Effects of the Invention

The silica particles of the present invention have a fine particle diameter, but the aggregation thereof is suppressed, and the uniformity of a silica particle dispersion containing the silica particles is excellent.

BRIEF DESCRIPTION OF THE DRAWINGS

FIG. 1 illustrates a transmission electron microscopic image (magnification of 200,000) of silica particles of Example 1.

FIG. 2 illustrates a transmission electron microscopic image (magnification of 200,000) of silica particles of Example 2.

MODE FOR CARRYING OUT THE INVENTION

The silica particles of the present invention have an average primary particle diameter $d_{BET}$ calculated from the specific surface area by a BET method of 1 nm or more and 100 nm or less and a ratio ($d_{DLS}/d_{BET}$) of an average secondary particle diameter $d_{DLS}$ measured by a dynamic light scattering method to the $d_{BET}$ of 1.2 or less. The uniformity of silica particle dispersion can be enhanced as the aggregation of silica particles is suppressed although the silica particles have such a fine particle diameter.

The average primary particle diameter $d_{BET}$ (hereinafter referred to as the "BET diameter" in some cases) calculated from the specific surface area by the BET method is preferably 70 nm or less, more preferably 50 nm or less, still more preferably 30 nm or less, and particularly preferably 25 nm or less and may be, for example, 3 nm or more and more preferably 5 nm or more.

The BET diameter $d_{BET}$ is obtained by calculating the average particle diameter based on the surface area and volume of silica particles, and the BET diameter $d_{BET}$ excludes the influence of the aggregation of silica particles and is an index of the particle diameter of primary particles.

In addition, the ratio of the average secondary particle diameter (hereinafter referred to as the "DLS diameter" in some cases) $d_{DLS}$ measured by the dynamic light scattering method to the BET diameter $d_{BET}$ is preferably 1.15 or less and more preferably 1.1 or less, and for example, a ratio of 1 or more or 1.01 or more is also acceptable.

In the dynamic light scattering method, the particle diameter is measured based on the moving velocity of silica particles in the methanol dispersion having a silica particles concentration of 1% by mass or more and 15% by mass or less. The particle diameter of silica particles aggregated (secondary particles) can be determined in a case in which the silica particles are aggregated, since the moving velocity of silica particles in the methanol dispersion correlates with the volume occupied by the silica particles. For this reason, the degree of aggregation of silica particles can be estimated from the ratio of the DLS diameter $d_{DLS}$ to the BET diameter $d_{BET}$.

The DLS diameter $d_{DLS}$ can be calculated as an average particle diameter (hydrodynamic diameter) determined by the cumulant method analysis of an autocorrelation function. The autocorrelation function is determined by irradiating a dispersion in which silica particles are dispersed in methanol so that the particle concentration is 1% by mass or more and 15% by mass or less (preferably 3% by mass or more and 12% by mass or less and more preferably 5% by mass or more and 10% by mass or less) with a laser beam (preferably a wavelength of 650 nm) and measuring the time dependent change in fluctuation of the scattered light intensity using the photon correlation method. The DLS diameter $d_{DLS}$ is an index of the particle diameter of secondary particles.

The BET diameter $d_{BET}$ is preferably 100 nm or less, more preferably 70 nm or less, more preferably 50 nm or less, still more preferably 30 nm or less, and particularly preferably 25 nm or less and may be, for example, 3 nm or more and more preferably 5 nm or more.

The BET diameter $d_{BET}$ can be determined from the specific surface area of silica particles measured by the BET method and the density of silica (2.2 g/cm³) based on the following equation.

$$d_{BET} \,(\mu m) = 6/(\text{specific surface area of silica particles measured by BET method } (m^2/g) \times \text{density of silica } (g/cm^3))$$

Furthermore, an average particle diameter (hereinafter referred to as the "TEM diameter" in some cases) $d_{TEM}$ measured based on a transmission electron microscopic image is preferably 100 nm or less, more preferably 70 nm or less, more preferably 50 nm or less, still more preferably 30 nm or less, and particularly preferably 25 nm or less and may be, for example, 3 nm or more and more preferably 5 nm or more.

The TEM diameter $d_{TEM}$ can be calculated as a number-based average value of measured diameters of 50 to 100 silica particles among silica particles contained in the transmission electron microscopic image obtained by being observed using a transmission electron microscope at a magnification of 200,000.

The coefficient of variation in the particle diameter of the silica particles measured using a transmission electron microscope at a magnification of 200,000 is preferably 20% or less, more preferably 12% or less, and still more preferably 8% or less and the coefficient of variation is also acceptable to be 2% or more or 4% or more.

The coefficient of variation in particle diameter of the silica particles can be calculated by observing the silica particles using a transmission electron microscope at a magnification of 200,000, measuring the diameters of 50 to 100 silica particles among the silica particles contained in the transmission electron microscopic image obtained, and dividing the standard deviation thereof by the number-based average value.

The specific surface area of the silica particles is preferably 30 to 1000 m²/g, more preferably 100 to 700 m²/g, and still more preferably 150 to 500 m²/g. The specific surface area of the silica particles can be measured by the BET method.

The average spherical ratio of the silica particles is preferably 1.2 or less, more preferably 1.1 or less, and still more preferably 1.05 or less and preferably 1 or more.

The average spherical ratio can be determined by observing the silica particles using a transmission electron microscope (magnification of 200,000), measuring the major axis and the minor axis of one silica particle to calculate the spherical ratio (major axis/minor axis), and averaging the spherical ratios measured for 50 silica particles.

In addition, it is preferable that the content of metals (transition metals such as Fe; alkali metals such as Na; alkaline earth metals such as Ca; and the like) as impurities is decreased in the silica particles of the present invention. For example, the content of impurity metals is preferably less than 5 ppm and more preferably less than 1 ppm in the silica particles.

The content of metals as the impurities can be measured using an inductively coupled plasma emission spectrometer (Agilent 8800; manufactured by Agilent Technologies, Inc. and the like). Specifically, the content of metals as the impurities can be measured using a liquid prepared as follows as a measurement sample liquid. The liquid is prepared by adding a powder sample (5 g) of silica particles to a mixture of hydrofluoric acid and nitric acid, mixing, and further adding nitric acid and hydrogen peroxide water sequentially to this mixture liquid so as to have a total volume of 50 mL.

The silica particles of the present invention may be subjected to a surface treatment using a surface treatment agent. The surface treatment agent preferably contains at least one kind of an organosilicon compound, an organic acid, or a titanium coupling agent and preferably contains at least an organosilicon compound.

As the organosilicon compound, a silane coupling agent and a disilazane compound are preferable.

The silane coupling agent means a compound in which a hydrolyzable group (a group capable of forming a silanol group by hydrolysis) and a functional group are bonded to a central silicon atom.

Examples of the silane coupling agent include alkoxysilane compounds such as methyltrimethoxysilane, methyltriethoxysilane, dimethyldimethoxysilane, dimethyldiethoxysilane, trimethylmethoxysilane, trimethylethoxysilane, vinyltrimethoxysilane, vinyltriethoxysilane, 2-(3,4-epoxycyclohexyl)ethyltrimethoxysilane, 3-glycidoxypropyltrimethoxysilane, 3-glycidoxypropylmethyldimethoxysilane, 3-glycidoxypropylmethyldiethoxysilane, 3-glycidoxypropyltriethoxysilane, 3-chloropropylmethyldimethoxysilane, 3-chloropropyltrimethoxysilane, p-styryltrimethoxysilane, 3-mercaptopropyltrimethoxysilane, 3-mercaptopropylmethyldimethoxysilane, 3-(2-aminoethylamino)propyltrimethoxysilane, 3-(2-aminoethylamino)propyltriethoxysilane, 3-aminopropyltrimethoxysilane, 3-aminopropyltriethoxysilane, 3-triethoxysilyl-N-(1,3-dimethyl-butylidene)propylamine, N-phenyl-3-aminopropyltrimethoxysilane, 3-isocyanatopropyltriethoxysilane, hexyltrimethoxysilane, hexyltriethoxysilane, octyltrimethoxysilane, octyltriethoxysilane, decyltrimethoxysilane, decyltriethoxysilane, trifluoropropyltrimethoxysilane, phenyltrimethoxysilane, phenyltriethoxysilane, diphenyldimethoxysilane, diphenyldiethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, and 3-acryloxypropylmethyldimethoxysilane; chlorosilane compounds such as methyltrichlorosilane, dimethyldichlorosilane, trimethylchlorosilane, vinyltrichlorosilane, methylvinyldichlorosilane, phenyltrichlorosilane, diphenyldichlorosilane, and methyldiphenylchlorosilane; acyloxysilane compounds such as tetraacetoxysilane, methyltriacetoxysilane, phenyltriacetoxysilane, dimethyldiacetoxysilane, diphenyldiacetoxysilane, and trimethylacetoxysilane; silazane compounds such as hexamethyldisilazane; and silanol compounds such as dimethylsilanediol, diphenylsilanediol, and trimethylsilanol.

The disilazane compound means a compound having a Si—N—Si bond in the molecule.

Examples of the disilazane compound include 1,1,1,3,3,3-hexamethyldisilazane, 1,1,3,3-tetramethyldisilazane, 1,3-bis(3,3,3-trifluoropropyl)-1,1,3,3-tetramethyldisilazane, 1,3-bis(chloromethyl)tetramethyldisilazane, 1,3-diphenyltetramethyldisilazane, 1,3-divinyl-1,1,3,3-tetramethyldisilazane, 2,2,4,4,6,6-hexamethylcyclotrisilazane, 2,4,6-trimethyl-2,4,6-trivinylcyclotrisilazane, heptamethyldisilazane, octamethylcyclotetrasilazane, hexamethyldisilazane lithium, hexamethyldisilazane sodium, and hexamethyldisilazane potassium.

The content ratio of the organosilicon compound is preferably 1% by mass or more, more preferably 10% by mass or more, and preferably 100% by mass or less in 100% by mass of the surface treatment agent.

In addition, the content ratio of the disilazane compound is preferably 1% by mass or more, more preferably 10% by mass or more, and preferably 100% by mass or less in 100% by mass of the sum of the disilazane compound and the silane coupling agent.

The organic acid is preferably a compound having a carboxyl group (hereinafter referred to as a "carboxylic acid compound" in some cases). The carboxylic acid compound may form a salt with a cation (for example, a metal cation such as an alkali metal cation or an alkaline earth metal cation; a molecular cation such as an ammonium ion).

As the carboxylic acid compound, (meth)acrylic acids; a carboxylic acid having one or more substituents (hereinafter referred to as a "specific substituent" in some cases) selected from the group consisting of an ester group, an ether group, an amide group, a thioester group, a thioether group, a carbonate group, a urethane group, and a urea group; and a compound having 4 to 20 carbon atoms and a carboxyl group which is one or more (preferably one) selected from a linear carboxylic acid (a linear aliphatic carboxylic acid, preferably a linear saturated aliphatic carboxylic acid or the like), a branched-chain carboxylic acid (a branched-chain aliphatic carboxylic acid, preferably a branched-chain saturated aliphatic carboxylic acid or the like), a cyclic carboxylic acid (an alicyclic carboxylic acid, preferably an alicyclic carboxylic acid which does not have an unsaturated double bond, or the like), an aromatic carboxylic acid or the like; are preferably employed.

Specific examples of the carboxylic acid compound include (meth)acrylic acids (for example, (meth)acryloxy$C_{1-6}$alkylcarboxylic acids such as acrylic acid, methacrylic acid, and 3-acryloxypropionic acid); carboxylic acids having ester groups such as half esters of $C_{3-9}$aliphatic dicarboxylic acids with (meth)acryloxy$C_{1-6}$alkyl alcohols (for example, 2-acryloxyethyl succinic acid and 2-methacryloxyethyl succinic acid), half esters of $C_{5-10}$alicyclic dicarboxylic acids with (meth)acryloxy$C_{1-6}$alkyl alcohols (for example, 2-acryloxyethyl hexahydrophthalic acid, 2-methacryloxyethyl hexahydrophthalic acid, 2-acryloxyethyl phthalic acid, and 2-methacryloxyethyl phthalic acid), and half esters of $C_{8-14}$aromatic dicarboxylic acids with (meth)acryloxy$C_{1-6}$alkyl alcohols (for example, 2-acryloxyethyl phthalic acid and 2-methacryloxyethyl phthalic acid); linear carboxylic acids such as butyric acid, valeric acid, hexanoic acid, heptanoic acid, octanoic acid, nonanoic acid, decanoic acid, dodecanoic acid, tetradecanoic acid, and stearic acid; branched-chain carboxylic acids such as pivalic acid, 2,2-dimethylbutyric acid, 3,3-dimethylbutyric acid, 2,2-dimethylvaleric acid, 2,2-diethylbutyric acid, 3,3-diethylbutyric acid, 2-methylhexanoic acid, 2-ethylhexanoic acid, 3-methylhexanoic acid, 3-ethylhexanoic acid, 2-methylheptanoic acid, 4-methyloctanoic acid, and neodecanoic acid; and cyclic carboxylic acids such as naphthenic acid and cyclohexanedicarboxylic acid.

Examples of the titanium coupling agent include isopropyl triisostearoyl titanate, isopropyl dimethacryl isostearoyl titanate, isopropyl tri(dodecyl)benzenesulfonyl titanate, neopentyl(diallyl)oxy-tri(dioctyl)phosphate titanate, and neopentyl(diallyl)oxy-trineododecanoyl titanate.

The surface treatment agent is preferably a surface treatment agent having a (meth)acryloyl group. As the surface treatment agent having a (meth)acryloyl, a silane coupling agent having a (meth)acryloyl group or an organic acid having a (meth)acryloyl group is preferable.

As the silane coupling agent having a (meth)acryloyl group (hereinafter referred to as a "(meth)acryloyl group-containing silane coupling agent" in some cases), those in which the hydrolyzable group is an alkoxy group are preferable. Examples thereof include bifunctional (meth)acryloyl group-containing silane coupling agents such as 3-acryloxypropyldimethoxymethylsilane, 3-acryloxypropyldiethoxymethylsilane, 3-methacryloxypropyldimethoxymethylsilane, and 3-methacryloxypropyldiethoxymethylsilane; and trifunctional (meth)acryloyl group-containing silane coupling agents such as 3-acryloxypropyltrimethoxysilane, 3-acryloxypropyltriethoxysilane, 3-methacryloxypropyltrimethoxysilane, and 3-methacryloxypropyltriethoxysilane.

The proportion of the (meth)acryloyl group-containing silane coupling agent (preferably a methacryloyl group-containing silane coupling agent) is preferably 10% by mass or more, more preferably 30% by mass or more, still more preferably 80% by mass or more, particularly preferably 90% by mass or more, and preferably 100% by mass or less in 100% by mass of the sum of silane coupling agents.

Examples of the organic acid having a (meth)acryloyl group include 2-acryloxyethylsuccinic acid, 2-methacryloxyethylsuccinic acid, 2-acryloxyethylhexahydrophthalic acid, 2-methacryloxyethylhexahydrophthalic acid, 2-acryloxyethylphthalic acid, and 2-methacryloxyethylphthalic acid.

The content ratio of the surface treatment agent having a (meth)acryloyl group is preferably 1% by mass or more, more preferably 10% by mass or more, and preferably 100% by mass or less in 100% by mass of the surface treatment agent.

The amount of surface treatment agent as a preparation amount is preferably 0.1 parts by mass or more, more preferably 1 part by mass or more, still more preferably 10 parts by mass or more, preferably 1000 parts by mass or less, more preferably 500 parts by mass or less, and still more preferably 100 parts by mass or less with respect to 100 parts by mass of silica particles.

The silica particles of the present invention can be produced by hydrolyzing and condensing an alkoxysilane in the presence of a basic catalyst and an aromatic heterocyclic compound having a nitrogen atom (hereinafter, referred to as a "nitrogen-containing aromatic heterocyclic compound"). It is regarded that alkoxysilanes are hydrolyzed and condensed in the presence of a basic catalyst, and at this time, the silicon atoms contained in the alkoxysilanes undergo the nucleophilic attack by OH⁻ derived from the basic catalyst and OSi⁻ derived from the hydrolyzed and condensed product of another alkoxysilane, and the reaction proceeds by a mechanism similar to the $S_N2$ reaction (G. J. Brinker, 1 other person, "SOL-GEL SCIENCE", 1990, ACADEMIC PRESS LIMITED, p 116-139). It is usual that as this hydrolysis and condensation proceeds, more highly electrophilic hydroxyl groups, SiO⁻ groups and the like are bonded to the central silicon atom of the alkoxysilane, the central silicon atom is more susceptible to nucleophilic attack, and hydrolysis condensation is more likely to proceed. However, in the present invention, it is considered that as the nitrogen-containing aromatic heterocyclic compound coexisting interacts with the hydrogen atoms of a hydroxyl group, the reactivity of the central silicon atom is deteriorated, the hydrolysis and condensation is diminished, and silica particles exhibiting suppressed aggregation is obtained even when the particle diameter is small.

The alkoxysilane is a compound having an alkoxy group as a substituent of silicon atom. The substituent of silicon atom may be an alkyl group having 2 to 6 carbon atoms or an aromatic hydrocarbon group having 6 to 10 carbon atoms other than the alkoxy group. In addition, the hydrogen atoms of the alkyl group may be substituted with a halogen atom, a vinyl group, a glycidyl group, a mercapto group, an amino group and the like.

Examples of the tetrafunctional alkoxysilane having only an alkoxy group as a substituent of silicon atom include tetramethoxysilane, tetraethoxysilane, tetraisopropoxysilane, tetrabutoxysilane, and dimethoxydiethoxysilane. In addition, examples of the alkoxysilane having an alkoxy group and an unsubstituted alkyl group as a substituent of silicon atom include trifunctional alkoxysilanes such as methyltrimethoxysilane and methyltriethoxysilane; difunctional alkoxysilanes such as dimethyldimethoxysilane and dimethyldiethoxysilane; and monofunctional alkoxysilanes such as trimethylmethoxysilane and trimethylethoxysilane. Furthermore, examples of the alkoxysilane having an alkoxy group and a substituted alkyl group as a substituent of silicon atom include chloroalkyl group-containing alkoxysilanes such as 3-chloropropylmethyldimethoxysilane and 3-chloropropyltrimethoxysilane; vinyl group-containing alkoxysilanes such as vinyltrimethoxysilane and vinyltriethoxysilane; aromatic group-containing alkoxysilanes such as phenyltrimethoxysilane, phenyltriethoxysilane, diphenyldimethoxysilane, and diphenyldiethoxysilane; glycidyl group-containing alkoxysilanes such as 3-glycidoxypropyltrimethoxysilane, 3-glycidoxypropylmethyldimethoxysilane, and 3-glycidoxypropylmethyldiethoxysilane; mercapto group-containing alkoxysilanes such as 3-mercaptopropyltrimethoxysilane; and amino group-containing alkoxysilanes such as 3-aminopropyltrimethoxysilane and 3-(2-aminoethylamino)propyltrimethoxysilane.

Among these, mono- to tetra-functional alkoxysilanes are preferable, tri- to tetra-functional alkoxysilanes are more preferable, and tetrafunctional alkoxysilanes are still more preferable. As the number of functional groups (the number of alkoxy groups) in the alkoxysilane is larger, impurities are less likely to be mixed in the silica fired body to be obtained. Among the alkoxysilanes to be used in the fired silica, a tetrafunctional alkoxysilane (preferably tetramethoxysilane or tetraethoxysilane) is preferably 90% by mass or more, more preferably 95% by mass or more, and still more preferably 98% by mass or more, and the upper limit thereof is 100% by mass. In addition, from the viewpoint of reactivity, the number of carbon atoms in the alkoxy group is preferably 1 to 5, more preferably 1 to 3, and still more preferably 1 to 2. In other words, alkoxysilanes to be particularly preferably used in the silica particles of the present invention are tetramethoxysilane and tetraethoxysilane.

The concentration of the alkoxysilane in the reaction liquid for hydrolyzing and condensing the alkoxysilane is preferably 0.05 mmol/g or more and more preferably 0.1 mmol/g or more. The upper limit thereof is not particularly limited but is preferably, for example, 3 mmol/g or less. When the concentration of the alkoxysilane in the reaction liquid is in this range, the control of reaction rate is easy and a uniform particle diameter can be obtained.

In addition, the concentration of water in the reaction liquid is preferably 2 mmol/g to 25 mmol/g. However, the amount of water is changed by the hydrolysis and condensation of alkoxysilane and is thus based on the amount at the time of preparation (before the start of hydrolysis and condensation). The molar ratio (water/alkoxysilane) of water to alkoxysilane is preferably 3 to 20 and more preferably 4 to 10. When the molar ratio of water to alkoxysilane is in this range, silanol groups remaining inside the silica particles are likely to decrease.

Examples of the basic catalyst include ammonias, amines, and quaternary ammonium compounds. Examples of the ammonias include ammonia and an ammonia generator such as urea. In addition, examples of the amines include aliphatic amines such as methylamine, ethylamine, propylamine, n-butylamine, dimethylamine, dibutylamine, trimethylamine, and tributylamine; alicyclic amines such as cyclohexylamine; aromatic amines such as benzylamine; and alkanolamines such as monoethanolamine, diethanolamine, and triethanolamine. In addition, examples of the quaternary ammonium compound include tetramethylammonium hydroxide and tetrabutylammonium hydroxide.

Among these, ammonias and amines are preferable from the viewpoint of easily controlling the particle diameter. In addition, from the viewpoint of enhancing the purity of silica particles to be obtained, a catalyst which is easily removed from the inside of silica is preferable. Specifically, ammonias and amines are preferable and ammonia and aliphatic amines are more preferable. In addition, from the viewpoint of being equipped with both the catalytic effect and the ease of removal, ammonias are preferable and ammonia is particularly preferable.

The concentration of the basic catalyst in the reaction liquid is preferably 0.8 mmol/g to 2 mmol/g. In addition, the mass ratio (basic catalyst/(basic catalyst+water)) of the basic catalyst to the sum of the basic catalyst and water is preferably 0.1 or more, more preferably 0.2 or more, preferably 0.4 or less, and more preferably 0.32 or less.

The nitrogen-containing aromatic heterocyclic compound is preferably an aromatic heterocyclic compound having a nitrogen atom on the ring. Examples thereof include monocyclic or polycyclic compounds having one nitrogen atom such as pyridine and quinoline; and monocyclic or polycyclic compounds having two or more nitrogen atoms such as bipyridine and imidazole. Only one kind of the nitrogen-containing aromatic heterocyclic compound may be used or two or more kinds thereof may be used. It is particularly preferable to use at least one kind of pyridine or imidazole as the nitrogen-containing aromatic heterocyclic compound.

The concentration of nitrogen-containing aromatic heterocyclic compound in the reaction liquid is preferably 0.01 mmol/g to 1 mmol/g. In addition, the mass ratio (nitrogen-containing aromatic heterocyclic compound/basic catalyst) of the nitrogen-containing aromatic heterocyclic compound to the basic catalyst is preferably 0.01 or more, more preferably 0.02 or more, preferably 0.5 or less, and more preferably 0.3 or less.

When an alkoxysilane is hydrolyzed and condensed, a diluent may further coexist. As a diluent is contained, the hydrophobic alkoxysilane is likely to be mixed with water, the dispersibility of silica particles to be obtained is improved as well as a hydrolysis and a condensation of the alkoxysilane in the reaction liquid can progress uniformly. A water-soluble organic solvent is preferable as the diluent, an alcohol solvent is preferable as the water-soluble organic solvent, examples thereof include monools such as methanol, ethanol, propanol, isopropyl alcohol, n-butyl alcohol, t-butyl alcohol, and pentyl alcohol; and diols such as ethylene glycol, propylene glycol, and 1,4-butanediol, and alcohols are preferable.

In the reaction liquid, the diluent is preferably 40% by mass or more, more preferably 50% by mass or more, and still more preferably 55% by mass or more, preferably 80% by mass or less, more preferably 70% by mass or less, and still more preferably 65% by mass or less.

In addition, the diluent is preferably 120 parts by mass or more, more preferably 150 parts by mass or more, still more preferably 180 parts by mass or more, preferably 500 parts by mass or less, more preferably 300 parts by mass or less, and still more preferably 250 parts by mass or less with respect to 100 parts by mass of the sum of the alkoxysilane and water.

As the amount of the diluent is greater, the reaction is easy to progress uniformly. As the amount of the diluent is smaller, the reaction rate can be more increased. However, the amount of the alcohol is changed by the hydrolysis and condensation of alkoxysilane, and the amount of the diluent is thus based on the amount at the time of preparation (before the start of the hydrolysis and condensation).

The reaction liquid may contain hydrophobic organic solvents such as ketones such as acetone and methyl ethyl ketone; esters such as ethyl acetate; paraffins such as isooctane and cyclohexane; ethers such as dioxane and diethyl ether; and aromatic hydrocarbons such as benzene and toluene. In a case in which these hydrophobic organic solvents are used, a surfactant may be added in order to improve the dispersibility thereof.

The respective components may be mixed in an appropriate order, but for example, a pre-mixture in which at least parts of the respective components (for example, water, the basic catalyst, the nitrogen-containing aromatic heterocyclic compound, and the diluent) are premixed together may be prepared and then mixed with the alkoxysilane. The alkoxysilane may be mixed with the pre-mixture after being previously mixed with the diluent.

When the alkoxysilane is hydrolyzed and condensed, the reaction temperature is preferably 0° C. to 100° C., more preferably 20° C. to 70° C., and still more preferably 20° C. to 50° C. In addition, the duration time of hydrolysis and condensation is preferably 30 minutes to 100 hours, more preferably 1 to 20 hours, and still more preferably 2 to 10 hours.

In a case in which the silica particles are subjected to a surface treatment using a surface treatment agent, it is preferable to add the surface treatment agent to the reaction liquid after the hydrolysis and condensation of the alkoxysilane.

The silica particles may be dried if necessary and may further be fired.

A silica particle dispersion containing the silica particles and a solvent (hereinafter sometimes referred to as a "dispersion solvent") is also included in the technical scope of the present invention. In the silica particle dispersion, it is preferable that the silica particles are dispersed in the dispersion solvent. The silica particle dispersion of the present invention exhibits favorable uniformity since the particle diameter of the silica particles contained is fine and the aggregation of the silica particles is suppressed.

The total light transmittance of the silica particle dispersion is preferably 60% or more, more preferably 70% or more, and still more preferably 75% or more and may be, for example, 100% or less and further 99% or less. The silica particles of the present invention have a fine particle diameter, at the same time, exhibit suppressed aggregation, and the total light transmittance of the silica particle dispersion tends to be high.

The total light transmittance of the silica particle dispersion can be measured using a turbidity meter such as "NDH-5000" manufactured by NIPPON DENSHOKU INDUSTIRES CO., LTD. by a measurement method according to JIS K7105.

The specific gravity of the silica particle dispersion is preferably 1.1 g/cm$^3$ or more, more preferably 1.2 g/cm$^3$ or more, preferably 2 g/cm$^3$ or less, and more preferably 1.5 g/cm$^3$ or less.

The viscosity of the silica particle dispersion is preferably 30 Pas or less, more preferably 1 Pas or less, still more preferably 0.1 Pa s or less, particularly preferably 0.01 Pas, preferably 0.001 mPa·s or more, and more preferably 0.01 mPa·s or more.

The viscosity can be measured using a B-type rotational viscometer and can be measured, for example, under the conditions of "B-type Viscometer" (Rotor No. 1, rotational speed: 10 rpm, room temperature (25° C.)) manufactured by TOM SANGYO CO., LTD.

The pH of the silica particle dispersion is preferably 5 to 12, more preferably 6 to 11, and still more preferably 6 to 10.

The concentration of the silica particles is preferably 3% by mass or more, more preferably 5% by mass or more, still more preferably 7% by mass or more, preferably 40% by mass or less, more preferably 30% by mass or less, and still more preferably 20% by mass or less in 100% by mass of the silica particle dispersion.

The dispersion solvent can be selected from water; alcohol-based solvents; ether-based solvents; ketone-based solvents; hydrocarbon-based solvents; halogenated hydrocarbon-based solvents; phenol-based solvents such as phenol; ester-based solvents; and the like.

Examples of the alcohol-based solvent include monool-based solvents such as methanol, ethanol, propanol, 2-propanol, butanol, 2-butanol, isobutyl alcohol, pentanol, methylbutanol, neopentyl alcohol, isopentyl alcohol, hexanol, 2-hexanol, heptanol, 2-heptanol, octanol, 2-octanol, cyclohexanol, and methylcyclohexanol; diol-based solvents such as ethanediol, propanediol, butanediol, pentanediol, methylpentanediol, and ethylpentanediol; triol-based solvents such as glycerin and hexanetriol; ether alcohol-based solvents such as methoxyethanol, ethoxyethanol, methoxymethoxyethanol, isopropoxyethanol, butoxyethanol, isopentyloxyethanol, hexyloxyethanol, phenoxyethanol, benzyloxyethanol, diethylene glycol, diethylene glycol monomethyl ether, diethylene glycol monoethyl ether, diethylene glycol monobutyl ether, triethylene glycol, triethylene glycol monomethyl ether, tetraethylene glycol, polyethylene glycol, methoxypropanol (propylene glycol monomethyl ether), ethoxypropanol, dipropylene glycol, dipropylene glycol monomethyl ether, dipropylene glycol monoethyl ether, tripropylene glycol monomethyl ether, and polypropylene glycol; halogenated alcohol-based solvents such as chloroethanol, chloropropanediol, and trifluoroethanol; hydroxypropionitrile; and amino alcohol-based solvents such as aminoethanol, dimethylaminoethanol, diethylaminoethanol, diethanolamine, N-butyldiethanolamine, and triethanolamine.

Examples of the ether-based solvent include aliphatic hydrocarbon ether-based solvents such as diethyl ether, dipropyl ether, diisopropyl ether, and dibutyl ether; aromatic hydrocarbon ether-based solvents such as butyl phenyl ether, pentyl phenyl ether, methoxy toluene, benzyl ethyl ether, diphenyl ether, and dibenzyl ether; cyclic ether-based solvents such as propylene oxide, furan, and tetrahydrofuran; and polyether-based solvents such as 1,2-dimethoxyethane, 1,2-diethoxyethane, 1,2-dibutoxyethane, diethylene glycol dimethyl ether, diethylene glycol diethyl ether, diethylene glycol dibutyl ether, and glycerin ether.

Examples of the ketone-based solvent include acetone, methyl ethyl ketone, 2-pentanone, 3-pentanone, 2-hexanone, methyl isobutyl ketone, 2-heptanone, diisobutyl ketone, cyclohexanone, methyl cyclohexanone, and acetophenone.

Examples of the hydrocarbon-based solvent include saturated aliphatic hydrocarbon-based solvents such as hexane, heptane, and octane; aromatic hydrocarbon-based solvents such as benzene, toluene, xylene, ethylbenzene, mesitylene, naphthalene, cyclohexylbenzene, and diethylbenzene; and saturated alicyclic hydrocarbon-based solvents such as cyclopentane, methylcyclopentane, cyclohexane, methylcyclohexane, and ethylcyclohexane.

Examples of the halogenated hydrocarbon-based solvent include chlorinated aliphatic hydrocarbon-based solvents such as methyl chloride, dichloromethane, chloroform, carbon tetrachloride, and ethyl chloride; and halogenated aromatic hydrocarbon solvents such as chlorobenzene, fluorobenzene, and hexafluorobenzene.

Examples of the ester-based solvent include formic acid ester-based solvents such as methyl formate, ethyl formate, propyl formate, butyl formate, isobutyl formate, and pentyl formate; acetic acid ester-based solvents such as methyl acetate, ethyl acetate, propyl acetate, butyl acetate, pentyl acetate, 3-methoxybutyl acetate, sec-hexyl acetate, 2-ethylbutyl acetate, 2-ethylhexyl acetate, cyclohexyl acetate, benzyl acetate, 2-methoxyethyl acetate, 2-ethoxyethyl acetate, 2-butoxyethyl acetate, 2-phenoxyethyl acetate, ethylene glycol monomethyl ether acetate, diethylene glycol monoethyl ether acetate, diethylene glycol monobutyl ether acetate, propylene glycol monomethyl ether acetate, methyl acetoacetate, ethyl acetoacetate, chloroacetic acid, dichloroacetic acid, trichloroacetic acid, and trifluoroacetic acid; propiononic acid ester-based solvents such as methyl propionate, ethyl propionate, butyl propionate, and isopentyl propionate; γ-butyrolactone: ethylene glycol monoacetate; ethylene diacetate; ethylene glycol ester; diethylene glycol monoacetate; carbonic acid ester-based solvents such as diethyl carbonate, ethylene carbonate, and propylene carbonate; and lactic acid ester-based solvents such as ethyl lactate.

The content of the dispersion solvent is preferably 100 parts by mass or more, more preferably 200 parts by mass or more, still more preferably 300 parts by mass or more, preferably 2000 parts by mass or less, and more preferably 1000 parts by mass or less with respect to 100 parts by mass of the silica particles.

The silica particle dispersion may be produced by dispersing the silica particles in the dispersion solvent or by substituting the solvent in the reaction liquid when the silica particles are prepared with a dispersion solvent. In the case of performing solvent substitution, the basic catalyst, nitrogen-containing aromatic heterocyclic compound and the like used when the silica particles are prepared can be removed by adding the dispersion solvent while filtering the silica particle dispersion through an ultrafiltration membrane. In addition, in a case in which the silica particles are subjected to a surface treatment using a surface treatment agent, it is preferable to perform solvent substitution after the surface treatment of silica particles is performed.

In other words, examples of a process for producing the silica particle dispersion include a method in which an alkoxysilane is hydrolyzed in the presence of water, a basic catalyst, and an aromatic heterocyclic compound having a nitrogen atom and the reaction liquid after hydrolysis and condensation of the alkoxysilane is filtered through an ultrafiltration membrane. It is also preferable to filter the reaction liquid after hydrolysis and condensation through an ultrafiltration membrane after adding a surface treatment agent to the reaction liquid. In the production process, a dispersion medium (for example, water or an alcohol-based solvent) different from the dispersion medium (reaction solvent) of the reaction liquid may be added while filtering the reaction liquid through an ultrafiltration membrane. This makes it possible to obtain a silica particle dispersion in which silica particles are dispersed in a solvent different from the reaction solvent. It is preferable that the silica particle dispersion after ultrafiltration is further treated using a cation exchange resin and the solvent thereof is substituted with a solvent (for example, at least one kind selected from ether-based solvents, ketone-based solvents, hydrocarbon-based solvents, halogenated hydrocarbon-based solvents, phenol-based solvents, or ester-based solvents) different from the solvent of the silica particle dispersion. This makes it possible to produce a silica particle dispersion in which silica particles are dispersed in at least one kind selected from ether-based solvents, ketone-based solvents, hydrocarbon-based solvents, halogenated hydrocarbon-based solvents, phenol-based solvents, or ester-based solvents. By the treatment using a cation exchange resin described above, the basic catalyst and the like adsorbed onto the particle surface can be removed. As to the substitution with the ether-based solvent or the like, a part of the solvent of the silica particle dispersion may be substituted or the whole of the solvent may be substituted. It is preferable that the solvent of the silica particle dispersion to be substituted is removed by solid-liquid separation means such as centrifugation or solvent distillation.

As the cation exchange resin, conventionally known ones can be used and either of a weakly acidic cation exchange resin or a strongly acidic cation exchange resin may be used. Examples of the weakly acidic cation exchange resin include Amberlite IRC-76 (ORGANO CORPORATION), DIAION WK10 and WK20 (Mitsubishi Chemical Corporation), and LEWATIT CNP80 (Bayer AG). Examples of the strongly acidic cation exchange resin include Amberlyst 16 and Amberlite IR-120B (manufactured by ORGANO CORPORATION), DIAION PK-208, PK-228, and PK-216 (manufactured by Mitsubishi Chemical Corporation), Duolite C-26 and Duolite ES-26 (manufactured by Sumitomo Chemical Co., Ltd.), and MSC-1 and 88 (manufactured by The Dow Chemical Company).

The content of the basic catalyst contained in the silica particle dispersion is preferably 3% by mass or less, more preferably 1% by mass or less, and still more preferably 0.1% by mass or less. In addition, the content of the nitrogen-containing aromatic heterocyclic compound contained in the silica particle dispersion is preferably 3% by mass or less, more preferably 1% by mass or less, and still more preferably 0.1% by mass or less.

It is preferable that the silica particle dispersion further contains a dispersant (surfactant), and the dispersibility can be further improved. In a case in which the silica particles are subjected to a surface treatment using a surface treatment agent, it is preferable that the silica particle dispersion contains a dispersant (surfactant) particularly in a case in which the surface treatment agent has a (meth)acryloyl group (an acryloyl group is more preferable). Particularly an effect of improving dispersibility can be effectively exerted in such a case.

As the dispersant (surfactant), conventionally known ones can be used, and either of ionic surfactants such as anionic surfactants, cationic surfactants, amphoteric surfactants or nonionic surfactants can be used. Examples of the anionic surfactant include fatty acid-based surfactants such as fatty acid sodium salts such as sodium oleate, sodium stearate, and sodium laurate, fatty acid potassium salts, sodium fatty acid ester sulfonate; phosphoric acid-based surfactants such as sodium alkyl phosphate; olefin-based surfactants such as sodium alpha oleic sulfonate; alcohol-based surfactants such as sodium alkyl sulfate; and alkyl benzene-based surfactants. Examples of the cationic surfactant include alkyl methyl ammonium chloride, alkyl dimethyl ammonium chloride, alkyl trimethyl ammonium chloride, and alkyl dimethyl benzyl ammonium chloride. Examples of the amphoteric surfactant include carboxylic acid-based surfactants such as alkylamino carboxylic acid salts and phosphoric acid ester-based surfactants such as phosphobetaine. In addition, examples of the nonionic surfactant include polyoxyethylene lanolin fatty acid ester, polyoxyethylene sorbitan fatty acid ester, polyoxyethylene alkyl ether, polyoxyethylene alkyl aryl ether, polyoxyethylene alkyl phenyl ether, polyoxyethylene alkyl amino ether, polyoxyethylene polycyclic phenyl ether, and fatty acid alkanolamide. Only one kind of dispersant (surfactant) may be used or two or more kinds thereof may be used.

Specific examples of the dispersant (surfactant) include Hypermer KD-1, Hypermer KD-2, Hypermer KD-3, and Atmer 163 manufactured by Croda Japan KK, EPOMIN SP-12, POLYMENT NK 350, and POLYMENT NK 380 manufactured by NIPPON SHOKUBAI CO., LTD., DISPARLON 1850, DISPARLON 1860, and DISPARLON DA-400N manufactured by Kusumoto Chemicals, Ltd., Newcol 400 Series and Newcol 1000 Series manufactured by NIPPON NYUKAZAI CO., LTD., and DisperBYK-162 and DisperBYK-2008 manufactured by BYK. From the viewpoint of improving the dispersibility of silica particles, it is preferable to use a dispersant (surfactant) having an amine structure. As such a dispersant (surfactant), Atmer 163 manufactured by Croda Japan KK and Newcol LA407 manufactured by NIPPON NYUKAZAI CO., LTD. are preferable.

In the silica particle dispersion of the present invention, it is preferable that the silica particles are subjected to a surface treatment using a surface treatment agent having an acryloyl group and the silica particle dispersion contains a dispersant (surfactant) having an amine structure. Particularly an effect of improving dispersibility can be effectively exerted in such a case. It is still more preferable that the solvent in the silica particle dispersion is an ether alcohol-based solvent or a ketone-based solvent.

The content of the dispersant (surfactant) is preferably 0.001 parts by mass or more, more preferably 0.01 parts by mass or more, still more preferably 0.1 parts by mass or more, preferably 10 parts by mass or less, more preferably 5 parts by mass or less, and still more preferably 3 parts by mass or less with respect to 100 parts by mass of the silica particles.

In addition, it is preferable that the content of metals (transition metals such as Fe; alkali metals such as Na; alkaline earth metals such as Ca; and the like) as impurities is decreased in the silica particle dispersion. For example, the content of impurity metals is preferably less than 5 ppm and more preferably less than 1 ppm in the silica particles. Moreover, examples of metals as impurities include heavy metals such as Pb and Cr and radioactive substances such as U and Th. It is preferable that the content of these metals is also decreased. The content of heavy metals is preferably less than 1 ppm, and the content of radioactive substances is preferably less than 0.1 ppb.

The content of metals as the impurities can be measured using an inductively coupled plasma emission spectrometer (Agilent 8800; manufactured by Agilent Technologies, Inc. and the like). Specifically, the content of metals as the impurities can be measured using a liquid prepared as follows as a measurement sample liquid. The measurement sample liquid is prepared by evaporating silica particle dispersion to dryness, adding the powder sample (5 g) obtained to a mixture of hydrofluoric acid and nitric acid and mixing, and further adding nitric acid and hydrogen peroxide water sequentially to this mixture liquid so as to have a total volume of 50 mL.

A silica particle-containing resin composition containing the silica particles and a polymerizable monomer and/or a polymer material (resin) is also included in the technical scope of the present invention.

The concentration of the silica particles is preferably 3% by mass or more, more preferably 5% by mass or more, and still more preferably 7% by mass or more, preferably 70% by mass or less, more preferably 50% by mass or less, preferably 40% by mass or less, more preferably 30% by mass or less, and still more preferably 20% by mass or less in 100% by mass of the silica particle-containing resin composition.

As the polymerizable monomer, one kind or two or more kinds can be used, and examples thereof include a monofunctional monomer and a crosslinkable monomer.

The monofunctional monomer may be a compound having one polymerizable carbon-carbon double bond, one kind or two or more kinds can be used, and examples thereof include (meth)acrylic acid esters; styrene-based monomers such as styrene, p-tert-butylstyrene, α-methylstyrene, m-methylstyrene, p-methylstyrene, p-chlorostyrene, and p-chloromethylstyrene; carboxyl group-containing monomers such as (meth)acrylic acid; hydroxyl group-containing monomers such as 2-hydroxyethyl (meth)acrylate, 3-hydroxy-2-hydroxypropyl (meth)acrylate, and 3-phenoxy-2-hydroxypropyl (meth)acrylate. Specific examples of the (meth)acrylic acid ester include (meth)acrylic acid alkyl esters such as methyl (meth)acrylate, ethyl (meth)acrylate, n-propyl (meth)acrylate, n-butyl (meth)acrylate, isobutyl (meth)acrylate, tert-butyl (meth)acrylate, 2-ethylhexyl (meth)acrylate, and lauryl (meth)acrylate; (meth)acrylic acid cycloalkyl esters such as cyclohexyl (meth)acrylate; (meth)acrylic acid aryl esters such as 2,4-dibromo-6-sec-butylphenyl (meth)acrylate, 2,4-dibromo-6-isopropylphenyl (meth)acrylate, phenyl (meth)acrylate, 2,4,6-tribromophenyl (meth)acrylate, and pentabromophenyl (meth)acrylate; (meth)acrylic acid aralkyl esters such as benzyl (meth) acrylate and pentabromobenzyl (meth)acrylate; (meth) acrylic esters having an aryloxy unit such as phenoxyethyl (meth)acrylate, phenoxy-2-methylethyl (meth)acrylate, 2,4,6-tribromophenoxyethyl (meth)acrylate, 2,4-dibromophenoxyethyl (meth)acrylate, 2-bromophenoxyethyl (meth)acrylate, 1-naphthyloxyethyl (meth)acrylate, 2-naphthyloxyethyl (meth)acrylate, phenoxy-2-methylethyl (meth)acrylate, and phenoxyethoxyethyl (meth)acrylate; (meth)acrylic acid esters having an arylthiooxy group such as phenylthioethyl (meth)acrylate, 1-naphthylthioethyl (meth)acrylate, and 2-naphthylthioethyl (meth)acrylate; alkylene glycol mono(meth)acrylates such as methoxy polyethylene glycol (meth)acrylate and phenoxy polyethylene glycol (meth)acrylate; and (meth)acrylic acid esters having a glycidyl group such as glycidyl (meth)acrylate.

The crosslinkable monomer may be a compound having plural carbon-carbon double bonds. As the crosslinkable monomer, one kind or two or more kinds can be used. Examples thereof include polyfunctional (meth)acrylates such as alkylene glycol poly(meth)acrylates such as ethylene glycol di(meth)acrylate, diethylene glycol di(meth)acrylate, propylene glycol di(meth)acrylate, polyethylene glycol di(meth)acrylate, 1,6-hexanediol di(meth)acrylate, dipropylene glycol di(meth)acrylate, tripropylene glycol di(meth) acrylate, polypropylene glycol di(meth)acrylate, tetramethylene glycol di(meth)acrylate; neopentyl glycol poly(meth) acrylates such as neopentyl glycol di(meth)acrylate and dineopentyl glycol di(meth)acrylate; trimethylolpropane poly(meth)acrylates such as trimethylolpropane tri(meth) acrylate, ethoxylated (3) trimethylolpropane tri(meth)acrylate, propoxylated (3) trimethylolpropane tri(meth)acrylate, epoxidized (3) trimethylolpropane tri(meth)acrylate, and ditrimethylolpropane tetra(meth)acrylate; glyceryl poly (meth)acrylates such as glyceryl tri(meth)acrylate and ethoxylated glyceryl tri(meth)acrylate; pentaerythritol poly (meth)acrylates such as pentaerythritol tri(meth)acrylate, pentaerythritol tetra(meth)acrylate, ethoxylated pentaerythritol tetra(meth)acrylate, propoxylated pentaerythritol tri (meth)acrylate, dipentaerythritol penta(meth)acrylate, and dipentaerythritol hexa(meth)acrylates; polyfunctional styrenic monomers such as divinyl benzene; polyfunctional allyl ester monomers such as diallyl phthalate, diallyl isophthalate, triallyl cyanurate, and triallyl isocyanurate; 2-(2-vinyloxyethoxy) ethyl (meth)acrylate; and urethane acrylate oligomers (for example, SHIKO (registered trademark) series (manufactured by Nippon Synthetic Chemical Industry Co., Ltd), CN series (manufactured by SARTOMER), UNIDIC (registered trademark) series (manufactured by DIC Corporation), and KAYARAD (registered trademark)) UX series (manufactured by Nippon Kayaku Co., Ltd.)).

The content of the polymerizable monomer is preferably 1 part by mass or more, more preferably 10 parts by mass or more, still more preferably 50 parts by mass or more, preferably 500 parts by mass or less, more preferably 300 parts by mass or less, and still more preferably 150 parts by mass or less with respect to 100 parts by mass of the silica particles.

As the polymer material (resin), one kind or two or more kinds can be used. Examples thereof include polyamides such as 6-nylon, 66-nylon, and 12-nylon; polyimides; polyurethanes; polyolefins such as polyethylene and polypropylene; polyesters such as PET, PBT, and PEN; polyvinyl chlorides; polyvinylidene chlorides; polyvinyl acetates; polystyrenes; (meth)acrylic resin-based polymers; ABS resins; fluororesins; phenol/formalin resins; phenol resins such as cresol/formalin resin; epoxy resins; urea resins; melamine resins; amino resins such as guanamine resin; polyvinyl butyral-based resins; polyurethane-based resins; ethylene-vinyl acetate copolymer-based resins; soft resins or hard resins such as ethylene-(meth)acrylate copolymer-based resins. Among the above, polyimides, polyurethanes, polyesters, (meth)acrylic resin-based polymers, phenol resins, amino resins, and epoxy resins are more preferable.

The content of the polymer material (resin) is preferably 1 part by mass or more, more preferably 10 parts by mass or more, still more preferably 50 parts by mass or more, preferably 500 parts by mass or less, more preferably 300 parts by mass or less, and still more preferably 150 parts by mass or less with respect to 100 parts by mass of the silica particles.

In a case in which the silica particle-containing resin composition of the present invention contains a polymerizable monomer, the silica particle-containing resin composition may further contain a polymerization initiator. Examples of the polymerization initiator include a photo-polymerization initiator and a thermal polymerization initiator. These may be used singly or in combination. Some of photopolymerization initiators act as a thermal polymerization initiator and some of thermal polymerization initiators act as a photopolymerization initiator, and thus those exhibiting both properties can cure the active energy ray-curable aqueous resin composition by being irradiated with light or heated. Among the polymerization initiators, a photopolymerization initiator is preferable since the photopolymerization initiator does not leave a heat history on the formed film, the substrate to which the active energy ray-curable aqueous resin composition is applied, and the like.

Examples of the thermal polymerization initiator include oil-soluble initiators such as 2,2'-azobis-(2-methylbutyronitrile), 2,2'-azobisisobutyronitrile, 2,2'-azobis-(2,4'-dimethyl-valeronitrile), benzoyl peroxide, 1,1-bis(tert-butylperoxy)-3,3,5-trimethylcyclohexane, and tert-butylperoxy-2-ethylhexanoate, persulfates such as potassium persulfate, ammonium persulfate, and sodium persulfate; water-soluble peroxides such as hydrogen peroxide; and water-soluble azo compounds such as 2,2'-azobis(2-amidinopropane)dihydrochloride, but in the present invention, the thermal polymerization initiator is not limited only to these examples. These thermal polymerization initiators may be each used singly or two or more kinds thereof may be used in combination.

Examples of the photopolymerization initiator include benzophenone, 1-[4-(2-hydroxyethoxy)phenyl]-2-hydroxy-2-methyl-1-propan-1-one, oxyphenyl-acetic acid 2-[2-oxo-2-phenylacetoxyethoxy]-ethyl ester, oxyphenylacetic acid 2-[2-hydroxyethoxy]-ethyl ester, 1-hydroxycyclohexyl phenyl ketone, 2,4,6-trimethylbenzoyl-diphenyl-phosphine oxide, bis(2,4,6-trimethylbenzoyl)-phenylphosphine oxide, 2-hydroxy-2-methyl-1-phenylpropan-1-one, 1-(4-isopropylphenyl)2-hydroxy-2-methylpropan-1-one, 2-methyl-1-[4-(methylthio)phenyl]2-morpholinopropan-1-one, 2-morpholinopropan-1-one, iodonium, sulfonium salts, diazonium salts, (4-methylphenyl[4-(2-methylpropyl)phenyl])-hexafluorophosphate, diethylthioxanthone, and isopropylthioxanthone, but in the present invention, the photopolymerization initiator is not limited only to these examples. These photopolymerization initiators may be each used singly or two or more kinds thereof may be used in combination.

The amount of the polymerization initiator is preferably 0.5 parts by mass or more, more preferably 1 part by mass or more, still more preferably 2 parts by mass or more, preferably 20 parts by mass or less, and more preferably 10 parts by mass or less with respect to 100 parts by mass of the polymerizable monomer.

The silica particle-containing resin composition may contain a solvent if necessary. Examples of the solvent contained in the silica particle-containing resin composition include the same solvents as the dispersion solvents.

The content of the solvent is preferably 0 parts by mass or more, more preferably 30 parts by mass or more, still more preferably 50 parts by mass or more, preferably 2000 parts by mass or less, and more preferably 1000 parts by mass or less with respect to 100 parts by mass of the silica particles.

The content of the basic catalyst contained in the silica particle-containing resin composition is preferably 3% by mass or less, more preferably 1% by mass or less, and still more preferably 0.1% by mass or less. In addition, the content of the nitrogen-containing aromatic heterocyclic compound contained in the silica particle-containing resin composition is preferably 3% by mass or less, more preferably 1% by mass or less, and still more preferably 0.1% by mass or less.

The silica particle-containing resin composition can be produced by mixing the silica particle dispersion and the polymerizable monomer and/or the polymer material (resin). If necessary, the solvent may be removed.

A cured coating film which is a cured product of the silica particle-containing resin composition is also included in the technical scope of the present invention.

The total light transmittance of the cured coating film is preferably 80% or more, more preferably 85% or more, and still more preferably 90% or more and may be 99% or less.

The total light transmittance of the cured coating film can be determined using a turbidity meter (NDH-5000 manufactured by NIPPON DENSHOKU INDUSTIRES CO., LTD.) according to the provisions of JIS K7361-1.

The haze of the cured coating film is preferably 0.3% or more, more preferably 0.5% or more, and still more preferably 0.6% or more and may be 99% or less.

The haze of the cured coating film can be determined using a turbidity meter (NDH-5000 manufactured by NIPPON DENSHOKU INDUSTIRES CO., LTD.) according to the provisions of JIS K7136: 2000.

The thickness of the cured coating film is preferably 0.1 µm or more, more preferably 1 µm or more, still more preferably 2 µm or more, preferably 20 µm or less, more preferably 10 µm or less, and still more preferably 7 µm or less.

The coating film can be produced by applying the silica particle-containing resin composition on a substrate or a film and curing the silica particle-containing resin composition. In a case in which the silica particle-containing resin composition contains the polymerizable monomer or the polymerization initiator, the silica particle-containing resin composition may be cured by being heated or irradiated with light (ultraviolet light).

The silica particles of the present invention can achieve both a fine particle diameter and suppressed aggregation and thus can provide a silica particle dispersion exhibiting excellent uniformity. The silica particles are useful for applications such as adhesive materials, dental materials, optical members, coating materials (for hard coating and for antiglare), and nanocomposite materials.

This application claims the benefit of priority based on the Japanese Patent Application No. 2017-76024 filed on Apr. 6, 2017 and the Japanese Patent Application No. 2017-126981 filed on Jun. 29, 2017. The entire contents of the Japanese Patent Application No. 2017-76024 filed on Apr. 6, 2017 and the Japanese Patent Application No. 2017-126981 filed on Jun. 29, 2017 are incorporated herein by reference.

EXAMPLES

Hereinafter, the present invention will be more specifically described with reference to Examples. However, the present invention is, of course, not limited by the following Examples and can, of course, be implemented with appropriate modifications as long as they can conform to the above or below gist of the present invention, and any of them can be included in the technical scope of the present invention. In the following, "parts" means "parts by mass" and "%" means "% by mass" unless otherwise noted.

The measurement methods and evaluation methods used in Examples are as follows.

[Measurement of Average Particle Diameter by BET Method (BET Diameter)]

The silica particles obtained were vacuum dried at 110° C., and then the specific surface area of the silica particles was measured by BET method using a fully automatic gas adsorption amount measuring apparatus Macsorb 1210 manufactured by MOUNTECH Co., Ltd. The BET diameter was determined based on the following equation. The density of silica adopted was 2.2 g/cm³.

$d_{BET}$ (µm)=6/(specific surface area of silica particles measured by BET method (m²/g)×density of silica (g/cm³))

[Measurement of Average Particle Diameter (TEM Diameter) Calculated from Electron Micrograph]

The average particle diameter (TEM diameter) of particles was measured by observing the particles under a transmission electron microscope (H-7650 manufactured by Hitachi High-Technologies Corporation). The particles were observed at a magnification of 200,000, and the length in the major axis direction of each particle was measured for 100 arbitrary particles, and the average value thereof was taken as the average primary particle diameter.

[Measurement of Average Particle Diameter (DLS Diameter) Based on Dynamic Light Scattering Method]

The particle diameter measured using a concentrated system particle size analyzer (FPAR 1000 manufactured by Otsuka Electronics Co., Ltd., wavelength of laser beam: 650 nm) is taken as the DLS diameter. As a sample for measurement in the dynamic light scattering method, a silica particle-dispersed liquid (a methanol dispersion having a proportion of silica particles of 9%) was used.

[Measurement of Total Light Transmittance of Cured Coating Film]

The total light transmittance of cured coating film was determined using a turbidity meter (NDH-5000 manufactured by NIPPON DENSHOKU INDUSTIRES CO., LTD.) according to the provisions of JIS K7361-1.

[Measurement of Haze of Cured Coating Film]

The haze of cured coating film was determined using a turbidity meter (NDH-5000 manufactured by NIPPON DENSHOKU INDUSTIRES CO., LTD.) according to the provisions of JIS K7136: 2000.

Example 1

Step (a)

Into a 20 L SUS container equipped with a stirrer, a dropping port, and a thermometer, 8120 g of methanol, 1426 g of water, 846 g of 25% aqueous ammonia, and 90 g of pyridine were added and stirred for 30 minutes to obtain a uniform solution. While this mixture was adjusted to 49° C. to 51° C. and stirred, 2840 g of tetramethyl orthosilicate (TMOS) was added to the solution dropwise through the dropping port over 1 hour. After completion of the dropwise addition, hydrolysis was continuously performed for 1 hour to obtain an alcoholic solution suspension (1) of silica fine particles. The suspension (1) obtained had a $SiO_2$ concentration of 8.8% and a pH of 10.86. The silica fine particles obtained had a BET diameter of 11.8 nm, a DLS diameter of 12.6 nm, a TEM diameter of 22.6 nm, and a coefficient of variation of 8%. In addition, the particles observed were spherical.

Step (b)

Using a commercially available ultrafiltration membrane in which a ceramic tubular ultrafiltration membrane with a molecular weight cut off of about 10000 is equipped with, the suspension (1) obtained in step (a) was subjected to solvent substitution while appropriately adding water thereto at room temperature and concentrated until the $SiO_2$ concentration reached about 11% to obtain a water dispersion (1) of silica fine particles. The liquid during the solvent substitution and concentration was stable and the solvent substitution and concentration smoothly proceeded. This water dispersion had a $SiO_2$ proportion of 11.90% and a pH of 9.37. The total light transmittance thereof was 90.0%.

Example 2

An alcoholic solution suspension (2) of silica fine particles was obtained in the same manner as in Example 1 except that 90 g of pyridine used was changed to 90 g of imidazole in step (a). The suspension (2) thus obtained had a $SiO_2$ concentration of 8.8% and a pH of 10.74. The silica fine particles obtained had a BET diameter of 10.0 nm, a DLS diameter of 11.4 nm, a TEM diameter of 22.7 nm, and a coefficient of variation of 9%. A water dispersion (2) of silica fine particles was obtained through the same step (b) as in Example 1 except that the suspension (2) obtained was used instead of the suspension (1).

Example 3

A methanol dispersion (3) of silica fine particles was obtained by performing the solvent substitution and the concentration until the $SiO_2$ concentration reached about 11% in the same manner as in Example 1 except that the solvent to be appropriately added in step (b) was changed from water to methanol after the same step (a) as in Example 1 was carried out. The liquid during the solvent substitution and concentration was stable and the solvent substitution and concentration smoothly proceeded. This methanol dispersion had a $SiO_2$ proportion of 11.90% and a pH of 9.54. The total light transmittance thereof was 88.8%.

Example 4

After the same step (a) as in Example 1 was carried out, 13322 g of the suspension (1) obtained was again heated to 50° C. and 267.0 g of hexamethyldisilazane (SZ-31 manufactured by Shin-Etsu Chemical Co., Ltd.) was added to the suspension dropwise through the dropping port over 2 hours. After completion of the dropwise addition, aging was continuously performed for 1 hour to obtain an alcoholic solution suspension (4) of hydrophobic silica fine particles. A methanol dispersion (4a) of hydrophobic silica fine particles was obtained by performing the solvent substitution and the concentration until the $SiO_2$ concentration reached about 11% in the same manner as in Example 1 except that the alcoholic solution suspension (4) was used instead of the alcoholic solution suspension (1) and the solvent to be appropriately added was changed from water to methanol in step (b). The methanol dispersion (4a) obtained was allowed to pass through a column packed with hydrogen-type strongly acidic cation exchange resin Amberlite IR-120B (manufactured by ORGANO CORPORATION) at room temperature and a rate of fluid flow of a space velocity 3 per one hour and further filtered through a 3 μm PTFE membrane filter to obtain a methanol dispersion (4b) of acidic hydrophobic silica fine particles. The solvent substitution and the concentration were performed until the $SiO_2$ concentration reached about 30% by sequentially adding 800 g of methyl isobutyl ketone (MIBK) while concentrating 1800 g of the obtained dispersion by vacuum distillation using a rotary evaporator, thereby a MIBK dispersion (4) of hydrophobic silica fine particles was obtained.

Example 5

A MIBK dispersion (5) of methacryloyl group-containing hydrophobic silica fine particles was obtained by performing the same treatment as in Example 4 except that 267.0 g of hexamethyldisilazane added in Example 4 was changed to 164.4 g of 3-methacryloxypropyltrimethoxysilane (KBM-503 manufactured by Shin-Etsu Chemical Co., Ltd.) and 213.6 g of hexamethyldisilazane.

Example 6

A MIBK dispersion (6) of acryloyl group-containing hydrophobic silica fine particles was obtained by performing the same treatment as in Example 4 except that 267.0 g of hexamethyldisilazane added in Example 4 was changed to 155.0 g of 3-acryloxypropyltrimethoxysilane (KBM-5103 manufactured by Shin-Etsu Chemical Co., Ltd.) and 213.6 g of hexamethyldisilazane.

Example 7

A MIBK dispersion (7) of vinyl group-containing hydrophobic silica fine particles was obtained by performing the same treatment as in Example 4 except that 267.0 g of hexamethyldisilazane added in Example 4 was changed to 100.2 g of vinyltrimethoxysilane (KBM-1003 manufactured by Shin-Etsu Chemical Co., Ltd.) and 213.6 g of hexamethyldisilazane.

Example 8

A MIBK dispersion (8) of amino group-containing hydrophobic silica fine particles was obtained by performing the same treatment as in Example 4 except that 267.0 g of hexamethyldisilazane added in Example 4 was changed to 118.4 g of 3-aminopropyltrimethoxysilane (KBM-903 manufactured by Shin-Etsu Chemical Co., Ltd.) and 213.6 g of hexamethyldisilazane.

Example 9

A MEK dispersion (9) of hydrophobic silica fine particles was obtained by performing the same treatment as in Example 4 except that 800 g of MIBK used at the time of solvent substitution in Example 4 was changed to 800 g of methyl ethyl ketone (MEK).

Example 10

A MEK dispersion (10) of methacryloyl group-containing hydrophobic silica fine particles was obtained by performing the same treatment as in Example 5 except that 800 g of MIBK used at the time of solvent substitution in Example 5 was changed to 800 g of methyl ethyl ketone (MEK).

Example 11

A MEK dispersion (11) of acryloyl group-containing hydrophobic silica fine particles was obtained by performing the same treatment as in Example 6 except that 800 g of MIBK used at the time of solvent substitution in Example 6 was changed to 800 g of methyl ethyl ketone (MEK).

Example 12

A MEK dispersion (12) of vinyl group-containing hydrophobic silica fine particles was obtained by performing the same treatment as in Example 7 except that 800 g of MIBK used at the time of solvent substitution in Example 7 was changed to 800 g of methyl ethyl ketone (MEK).

Example 13

A MEK dispersion (13) of amino group-containing hydrophobic silica fine particles was obtained by performing the same treatment as in Example 8 except that 800 g of MIBK used at the time of solvent substitution in Example 8 was changed to 800 g of methyl ethyl ketone (MEK).

Example 14

A PGM dispersion (14) of hydrophobic silica fine particles was obtained by performing the same treatment as in Example 4 except that 800 g of MIBK used at the time of solvent substitution in Example 4 was changed to 800 g of propylene glycol monomethyl ether (PGM).

Example 15

A PGM dispersion (15) of methacryloyl group-containing hydrophobic silica fine particles was obtained by performing the same treatment as in Example 5 except that 800 g of MIBK used at the time of solvent substitution in Example 5 was changed to 800 g of propylene glycol monomethyl ether (PGM).

Example 16

A PGM dispersion (16) of acryloyl group-containing hydrophobic silica fine particles was obtained by performing the same treatment as in Example 6 except that 800 g of MIBK used at the time of solvent substitution in Example 6 was changed to 800 g of propylene glycol monomethyl ether (PGM).

Example 17

A PGM dispersion (17) of vinyl group-containing hydrophobic silica fine particles was obtained by performing the same treatment as in Example 7 except that 800 g of MIBK used at the time of solvent substitution in Example 7 was changed to 800 g of propylene glycol monomethyl ether (PGM).

Example 18

A PGM dispersion (18) of amino group-containing hydrophobic silica fine particles was obtained by performing the same treatment as in Example 8 except that 800 g of MIBK used at the time of solvent substitution in Example 8 was changed to 800 g of propylene glycol monomethyl ether (PGM).

Example 19

Into light and dark brown glass bottles, 6.7 g of the MIBK dispersions (4), (5), and (6) of hydrophobic silica fine particles synthesized in Examples 4 to 6, 2.0 g of an acrylic monomer (SR351S (trimethylol propane triacrylate, manufactured by SARTOMER), SR492 (propoxylated trimethylol propane triacrylate manufactured by SARTOMER), SR444 (pentaerythritol triacrylate manufactured by SARTOMER), or KAYARD DPHA (dipentaerythritol hexaacrylate manufactured by Nippon Kayaku Co., Ltd.), 11.3 g of methyl isobutyl ketone, and 0.06 g of Irgacure 184 (photo radical polymerization initiator manufactured by BASF SE) were charged and stirred until the mixtures became uniform to obtain silica particle-containing compositions.

Example 20

Into light and dark brown glass bottles, 6.7 g of the PGM dispersions (15) and (16) of hydrophobic silica fine particles synthesized in Examples 15 and 16, 2.0 g of an acrylic monomer (SR351S (trimethylol propane triacrylate, manufactured by SARTOMER), SR492 (propoxylated trimethylol propane triacrylate manufactured by SARTOMER), SR444 (pentaerythritol triacrylate manufactured by SARTOMER), or KAYARD DPHA (dipentaerythritol hexaacrylate manufactured by Nippon Kayaku Co., Ltd.), 11.3 g of propylene glycol monomethyl ether, and 0.06 g of Irgacure 184 (photo radical polymerization initiator manufactured by BASF SE) were charged and stirred until the mixtures became uniform to obtain silica particle-containing compositions.

Example 21

The silica particle-containing compositions obtained in Examples 19 and 20 were applied onto PET films (Cosmo Shine A4300 manufactured by TOYOBO CO., LTD., film thickness: 100 μm) using a bar coater so that the film thickness reached 5 μm, dried at 80° C. for 5 minutes, and then cured by being irradiated with ultraviolet light of 500 mJ/m$^2$ using a high pressure mercury lamp to obtain cured coating films. The thickness of the cured coating films was 5 μm.

The measurement results for the total light transmittance and haze of the cured coating films obtained are shown in Table 1.

TABLE 1

| | | | | Example 21 | | | | | | | | | | | | |
|---|---|---|---|---|---|---|---|---|---|---|---|---|---|---|---|---|
| Silica particle-containing resin composition | Silica particle dispersion | MIBK dispersion (4) of hydrophobic silica fine particles | g | 6.7 | 6.7 | 6.7 | 6.7 | | | | | | | | |
| | | MIBK dispersion (5) of hydrophobic silica fine particles | g | | | | | 6.7 | 6.7 | 6.7 | 6.7 | | | | |
| | | MIBK dispersion (6) of hydrophobic silica fine particles | g | | | | | | | | | 6.7 | 6.7 | 6.7 | 6.7 |
| | Polymerizable monomer | Trimethylol propane triacrylate | g | 2 | | | | 2 | | | | 2 | | | |
| | | Propoxylated trimethylol propane triacrylate | g | | 2 | | | | 2 | | | | 2 | | |
| | | Pentaerythritol triacrylate | g | | | 2 | | | | 2 | | | | 2 | |
| | | Dipentaerythritol hexaacrylate | g | | | | 2 | | | | 2 | | | | 2 |
| | Solvent | Methyl isobutyl ketone | g | 11.3 | 11.3 | 11.3 | 11.3 | 11.3 | 11.3 | 11.3 | 11.3 | 11.3 | 11.3 | 11.3 | 11.3 |
| | Initiator | Irgacure 184 | g | 0.06 | 0.06 | 0.06 | 0.06 | 0.06 | 0.06 | 0.06 | 0.06 | 0.06 | 0.06 | 0.06 | 0.06 |
| Evaluation of cured coating film | | Total light transmittance | % | 91.85 | 91.03 | 91.79 | 91.56 | 91.68 | 91.70 | 91.51 | 91.63 | 91.83 | 91.89 | 91.55 | 91.96 |
| | | Haze | % | 0.64 | 0.54 | 0.55 | 0.68 | 0.63 | 0.73 | 0.87 | 0.74 | 0.84 | 0.77 | 0.65 | 0.81 |

| | | | | Example 21 | | | | | | | | |
|---|---|---|---|---|---|---|---|---|---|---|---|---|
| Silica particle-containing resin composition | Silica particle dispersion | PGM dispersion (15) of hydrophobic silica fine particles | g | 6.7 | 6.7 | 6.7 | 6.7 | | | | |
| | | PGM dispersion (16) of hydrophobic silica fine particles | g | | | | | 6.7 | 6.7 | 6.7 | 6.7 |
| | Polymerizable monomer | Trimethylol propane triacrylate | g | 2 | | | | 2 | | | |
| | | Propoxylated trimethylol propane triacrylate | g | | 2 | | | | 2 | | |
| | | Pentaerythritol triacrylate | g | | | 2 | | | | 2 | |
| | | Dipentaerythritol hexaacrylate | g | | | | 2 | | | | 2 |
| | Solvent | Propylene glycol monomethyl ether | g | 11.3 | 11.3 | 11.3 | 11.3 | 11.3 | 11.3 | 11.3 | 11.3 |
| | Initiator | Irgacure 184 | g | 0.06 | 0.06 | 0.06 | 0.06 | 0.06 | 0.06 | 0.06 | 0.06 |
| Evaluation of cured coating film | | Total light transmittance | % | 91.51 | 91.44 | 91.29 | 91.70 | 91.55 | 91.21 | 91.59 | 91.21 |
| | | Haze | % | 0.60 | 0.77 | 0.75 | 0.78 | 0.96 | 0.78 | 0.68 | 0.75 |

Example 22

To the MIBK dispersion (6) of acryloyl group-containing hydrophobic silica fine particles obtained in Example 6, 5.6 g of Newcol LA407 (manufactured by NIPPON NYUKA-ZAI CO., LTD.) was added to obtain a MIBK dispersion (22) of acryloyl group-containing hydrophobic silica fine particles containing a dispersant (having an amine structure).

Example 23

To the MIBK dispersion (6) of acryloyl group-containing hydrophobic silica fine particles obtained in Example 6, 5.6 g of Atmer 163 (manufactured by Croda Japan KK) was added to obtain a MIBK dispersion (23) of acryloyl group-containing hydrophobic silica fine particles containing a dispersant (having an amine structure).

Example 24

To the MEK dispersion (11) of acryloyl group-containing hydrophobic silica fine particles obtained in Example 11, 5.6 g of Newcol LA407 (manufactured by NIPPON NYUKA-ZAI CO., LTD.) was added to obtain a MEK dispersion (24) of acryloyl group-containing hydrophobic silica fine particles containing a dispersant (having an amine structure).

Example 25

To the MEK dispersion (11) of acryloyl group-containing hydrophobic silica fine particles obtained in Example 11, 5.6 g of Atmer 163 (manufactured by Croda Japan KK) was added to obtain a MEK dispersion (25) of acryloyl group-containing hydrophobic silica fine particles containing a dispersant (having an amine structure).

Example 26

To the PGM dispersion (16) of acryloyl group-containing hydrophobic silica fine particles obtained in Example 16, 5.6 g of Newcol LA407 (manufactured by NIPPON NYUKA-ZAI CO., LTD.) was added to obtain a PGM dispersion (26) of acryloyl group-containing hydrophobic silica fine particles containing a dispersant (having an amine structure).

Example 27

To the PGM dispersion (16) of acryloyl group-containing hydrophobic silica fine particles obtained in Example 16, 5.6 g of Atmer 163 (manufactured by Croda Japan KK) was added to obtain a PGM dispersion (27) of acryloyl group-containing hydrophobic silica fine particles containing a dispersant (having an amine structure).

INDUSTRIAL APPLICABILITY

The silica particles of the present invention can achieve both a fine particle diameter and suppressed aggregation and thus can provide a silica particle dispersion exhibiting excellent uniformity. The silica particles are useful for applications such as adhesive materials, dental materials, optical members, coating materials (for hard coating and for antiglare), and nanocomposite materials.

The invention claimed is:

1. Silica particles having a $d_{BET}$ calculated from a specific surface area by a BET method of 1 nm or more and 100 nm or less and a ratio ($d_{DLS}/d_{BET}$) of a $d_{DLS}$ measured by a dynamic light scattering method to the $d_{BET}$ of 1.2 or less.

2. The silica particles according to claim 1, wherein a coefficient of variation in a particle diameter of the silica particles measured using a transmission electron microscope at a magnification of 200,000 is 20% or less.

3. The silica particles according to claim 1, wherein the silica particles are subjected to a surface treatment using a surface treatment agent.

4. The silica particles according to claim 3, wherein the surface treatment agent is a surface treatment agent having a (meth)acryloyl group.

5. A process for producing silica particles, comprising hydrolyzing an alkoxysilane in the presence of water, a basic catalyst, and an aromatic heterocyclic compound having a nitrogen atom,
wherein the silica particles have a $d_{BET}$ calculated from a specific surface area by a BET method of 1 nm or more and 100 nm or less and a ratio ($d_{DLS}/d_{BET}$) of a $d_{DLS}$ measured by a dynamic light scattering method to the $d_{BET}$ of 1.2 or less.

6. A silica particle dispersion comprising the silica particles according to claim 1, and a solvent.

7. The silica particle dispersion according to claim 6, wherein the silica particle dispersion further comprises a dispersant.

8. The silica particle dispersion according to claim 7, wherein a molecular structure of the dispersant has an amine structure.

9. A silica particle-containing resin composition comprising the silica particles according to claim 1 and a polymerizable monomer and/or a polymer material.

* * * * *